UNITED STATES PATENT OFFICE.

JOHN C. HEBDEN, OF PROVIDENCE, RHODE ISLAND, ASSIGNOR TO W. RODMAN PEABODY, OF CAMBRIDGE, MASSACHUSETTS.

PROCESS OF VAT-DYEING.

1,148,966.  Specification of Letters Patent.  Patented Aug. 3, 1915.

No Drawing.  Application filed December 30, 1912. Serial No. 739,256.

*To all whom it may concern:*

Be it known that I, JOHN C. HEBDEN, a citizen of the United States, residing at Providence, in the county of Providence and State of Rhode Island, have invented certain new and useful Improvements in Processes of Vat-Dyeing, of which the following is a specification.

My invention relates to an improvement in the art of dyeing with vat dyes, so called. Vat dyes are insoluble in ordinary solvents used in dyeing. To prepare these dyes for dyeing they are treated with reducing agents whereby they take up hydrogen and are converted into leuco compounds which react like weak acids and form with suitable compounds alkali salts more or less soluble in water. These alkali salts have an affinity for vegetable and animal fibers, and their solutions, according to their individual characteristics, are employed in vat dyeing in one of three ways: (1) the indigo or dipping vat method, (2) the cold vat method without dipping, and (3) the hot vat method without dipping. The vat dyes, from which these solutions are made, may therefore be divided into three classes according to the way in which the solutions are employed. In dyeing with dyes of each one of these three classes difficulty has been experienced in extracting all of the dye from the dye-bath, and it has been found impracticable to dye by mixing in the dye-bath two or more dyes which require different amounts of the reducing agent, or different amounts of the solvent, or different strengths of alkali, or different temperatures for dyeing, or which belong to the different classes above mentioned, without causing a loss of a large proportion of the dyes employed.

It is the object of my invention to remedy this difficulty and to provide a process which is applicable to any vat dye of any one of the three classes named, and by which a mixture of two or more dyes of the same class or of different classes may be employed, and by which substantially all of the dye or dyes used may be extracted from the dye-bath.

I first treat the dye or mixture of dyes with sufficient alkali such as caustic soda and sufficient reducing agent, such as hydrosulfite of soda, to produce the leuco compound from the dye or mixture used and to bring the same into solution. I prefer to use an excess of alkali and reducing agent for I am then able to work a dye vat which is free from flurry, and which therefore causes no precipitation of oxidized color on the fiber, thus eliminating the precipitation of loosely adhering dyestuff which is not as fast as the color which is thoroughly penetrated into the fiber and oxidized therein from the thoroughly reduced dyestuff.

I prefer to dye cold in order to prevent the formation of secondary reaction products from the leuco color compounds due to the action of heat upon the dye-bath. I then gradually or progressively diminish the alkalinity of the dye bath, or its capacity for dissolving the leuco compound, by any suitable method, preferably as below described, in some cases going so far as completely to neutralize the bath or even to render it weakly acid. The effect of this diminution of the solvent capacity of the bath is to precipitate or affix the leuco compound or compounds of the bath upon the fiber. In case the bath contains a mixture of leuco compounds which vary in respect to their acid functions or their solubility in alkaline solutions, such compounds will be fixed upon the fiber as the degree of alkalinity requisite for such fixation is reached in the course of the progressive diminution.

In diminishing the alkalinity of the bath, or otherwise reducing its solvent capacity for the leuco compounds, it is not necessary to remove the goods; and the color, being gradually or progressively precipitated, may be completely fixed in the fiber without lifting the latter from the bath, or dipping. As the bath is strongly reducing in character, there is no oxidation of the leuco compound until it has all been precipitated upon the fiber. The material is then removed from the bath and subjected to oxidation in the usual way.

Suitable methods of diminishing the solvent capacity of the bath are as follows, the choice of method being dependent upon the nature of the dye or mixture of dyes and upon the manner of manipulating the bath: (1) by gradual or progressive addition of a weak solution of an acid; (2) by like addition of acid salts, in which term I include such salts as the alkali metal bicarbonates, which have an acid constitution but react as alkalis to most indicators; (3) by transposition methods, whereby the caustic soda or other alkali hydroxid is replaced wholly or in part by a weaker alkali, or by an alkali having a less solvent effect upon the leuco compound, usually ammonia. For instance, the addition of a neutral ammonium salt, as ammonium sulfate to a bath containing caustic soda, will result in the formation of sodium sulfate and ammonia according to the equation:

$$2NaOH + (NH_4)_2SO_4 = Na_2SO_4 + 2NH_4OH,$$

any desired proportion of the fixed alkali hydroxid being thus transposed. According to this method the solvent capacity of the bath may be reduced without varying its alkalinity as measured by its capacity for neutralizing acids.

The present method is particularly suited for dyeing in circulating dyeing machines, because in such machines the dye liquor can be circulated constantly, and the gradual addition of the acid or of the alkali salt can be effectively accomplished.

The acid used for neutralizing the caustic soda or other alkali is preferably one which is weaker than the reducing agent such as hydrosulfite of soda, so that the latter whether combined with the dyestuff or free in the bath will not be decomposed. Stronger acids, however, may be used if added with caution: acid salts, fatty acids, phenols, sulfonic and carboxylic acids may be used.

Ammonia salts are preferably used in most cases for transposing the stronger alkali, but other alkali salts may be used for special colors or combination of colors. In order to prevent the injurious action of an acid solution on the leuco dye, a certain proportion of the caustic soda may be neutralized by acid, and the remainder transposed by the use of an alkali salt.

As an example of the application of my method using an acid salt to diminish the alkalinity of the bath, the following recipe for producing a green by a mixture of algol yellow 3G (a cold vat color) with alizarin indigo G. (a hot vat color) may be cited. 2% of the weight of the goods of alizarin indigo G paste and 4% of the weight of the goods of algol yellow 3G paste are reduced in a small volume of water by adding 3% of dry caustic soda and 3% of hydrosulfite of sodium powder 98 per cent. pure. After the reduction is completed the solution of the leuco compound is added to the dye bath preferably containing monopole oil, soap or other assistants. The material is entered into the dye bath and worked for ten or fifteen minutes. There is then added, in three portions, at intervals of five or ten minutes, a solution of 12% of the weight of sodium powder 98 per cent. pure. After the goods have been worked and the dye exhausted, the goods are lifted, drained, oxidized, and washed by the regular method.

As an illustration of the application of my method, using a salt of an alkali to transpose the alkali used as the solvent, I cite the following example of the dyeing of a mixture of a hot vat dyeing color and indigo. 7½% of the weight of the goods of indanthrene dark blue B. G. O. paste and 2½% of indigo M. L. B. 2B are reduced in a small volume of water, using 4% of dry caustic soda and 3½% of hydrosulfite of soda powder 98 per cent. pure. The solution of the reduced dyestuffs is added to the dye-bath preferably with monopole oil, soap or other assistants; the goods are entered and worked for ten or fifteen minutes. There is then added, at intervals of five or ten minutes, in three portions, a solution of 6% of the weight of the goods of sulfate of ammonia. The goods are worked in this solution and after the color is exhausted the goods are lifted from the vat, oxidized by the regular method, and finished. In both cases the temperature of the dye-bath is maintained at from 75° to 90° F., and the dyeing is completed in one hour to one hour and a half.

To illustrate the application of my method using an acid to neutralize the alkali used as the solvent, I cite the following example of dyeing indigo and a cold dyeing vat color. I take 5% of the weight of the goods of indigo G. B. A. S. F., 2½% of the weight of the goods of algol corinth G., 3% of the weight of the goods of caustic soda (dry) and 2½% of the weight of the goods of hydro-sulfite, 98% powder, and mix them in a small volume of water. When the reduction of the dyestuffs is completed, the solution of the leuco compound is added to the dye bath together with monopole oil, soap, or other assistants. The goods are then entered into the dye bath and worked for a short time. There is then added to the bath in three to five portions at intervals of from five to ten minutes a solution of 3% of the weight of the goods of phosphoric acid (100% pure). When the bath is exhausted the goods are lifted, oxidized and finished.

It is not necessary that the compound which is used to neutralize or transpose the solvent be added to the dye bath. The solution of the leuco compound of the dyestuff may be in one dye kettle and the solution of the compound used to neutralize or partially neutralize or transpose the solvent can be in another. The goods after being saturated with the solution of the reduced dyestuff, are squeezed to get rid of surplus color solution and are then passed into the solution of the compound used to neutralize or transpose the solvent. The color is thus fixed on the fiber. The goods are then lifted from the bath, oxidized and finished. This method is of particular value in dyeing piece goods.

In the foregoing I have described my invention as applied to the dyeing of vegetable fibers; it is applicable as well to the dyeing of wool. In this case, however, the free alkali is neutralized as far as practicable, and is preferably transposed to ammonium hydroxid, before the goods are entered into the bath, to prevent injurious action of the alkali upon the wool, the alkalinity being thereafter further diminished to fix the leuco compound upon the fiber, as above described. Various substances, such as glue, dextrin, gluten, etc., may be added to the bath to lessen or modify the action of the alkali.

I claim:

1. The process of vat dyeing, which consists in bringing the fibrous material into contact with an alkaline bath containing a leuco compound, progressively diminishing the solvent capacity of the bath under conditions to fix the leuco compound upon the fiber, and thereafter oxidizing the same.

2. The process of vat dyeing, which consists in bringing the fibrous material into contact with an alkaline bath containing a leuco compound, progressively reducing the alkalinity and diminishing the solvent capacity of the bath under conditions to fix the leuco compound upon the fiber, and thereafter oxidizing the same.

3. The process of vat dyeing, which consists in immersing a fibrous material in an alkaline bath containing a leuco compound, progressively diminishing the solvent capacity of the bath and thereby fixing the leuco compound upon the fiber, and thereafter oxidizing the same.

4. The process of vat dyeing, which consists in immersing a fibrous material in an alkaline bath containing a leuco compound, progressively reducing the alkalinity and diminishing the solvent capacity of the bath and thereby fixing the leuco compound upon the fiber, and thereafter oxidizing the same.

5. In a process of vat dyeing, the step which consists in fixing a leuco compound upon a fiber by progressively diminishing the solvent capacity of the bath.

6. In a process of vat dyeing, the step which consists in fixing a leuco compound upon a fiber by progressively reducing the alkalinity and diminishing the solvent capacity of the bath.

7. In a process of vat dyeing, the step which consists in progressively diminishing the solvent capacity of a bath containing a leuco compound and a fixed alkali hydroxid, by adding thereto a salt of a base having a lesser solvent capacity for the leuco compound, and thereby precipitating the leuco-compound upon the fiber.

8. In a process of vat dyeing, the step which consists in progressively diminishing the solvent capacity of a fixed alkali hydroxid for leuco compounds, by adding thereto an ammonium salt, and thereby precipitating the leuco-compound upon the fiber.

In testimony whereof I affix my signature in presence of two witnesses.

JOHN C. HEBDEN.

Witnesses:
Guy Cunningham,
James S. Stone.

Copies of this patent may be obtained for five cents each, by addressing the "Commissioner of Patents, Washington, D. C."

Correction in Letters Patent No. 1,148,966.

It is hereby certified that in Letters Patent No. 1,148,966, granted August 3, 1915, upon the application of John C. Hebden, of Providence, Rhode Island, for an improvement in "Processes of Vat-Dyeing," an error appears in the printed specification requiring correction as follows: Page 2, line 62, strike out the words and numerals "sodium powder 98 per cent. pure" and insert the words *the goods of bicarbonate of soda;* and that the said Letters Patent should be read with this correction therein that the same may conform to the record of the case in the Patent Office.

Signed and sealed this 2nd day of November, A. D., 1915.

[SEAL.]

R. F. WHITEHEAD,
*Acting Commissioner of Patents.*